United States Patent [19]

Rodden

[11] Patent Number: 5,176,798
[45] Date of Patent: Jan. 5, 1993

[54] SYSTEM FOR REMOVAL AND DISPOSAL OF MINOR AMOUNTS OF ORGANICS FROM CONTAMINATED WATER

[75] Inventor: John B. Rodden, Sugar Land, Tex.

[73] Assignee: Shell Oil Company, Houston, Tex.

[21] Appl. No.: 701,716

[22] Filed: May 17, 1991

[51] Int. Cl.⁵ .......................................... B01D 3/26
[52] U.S. Cl. ............................. 202/159; 202/177;
202/182; 202/183; 202/197; 202/234; 55/180;
55/196; 55/387; 203/10; 203/23; 203/41;
203/49; 203/95; 210/202; 210/774; 210/806
[58] Field of Search .............. 202/234, 183, 200, 182,
202/197, 177; 203/49, 10, 11, 41, 23, 95, DIG.
17; 55/196, 180, 387; 210/202, 774, 806

[56] References Cited

U.S. PATENT DOCUMENTS

| | | | |
|---|---|---|---|
| 1,661,403 | 3/1928 | Barnebey | 203/41 |
| 3,326,778 | 6/1967 | Mock | 202/234 |
| 3,655,048 | 4/1972 | Pergola | 210/67 |
| 3,827,861 | 8/1974 | Zenkner | 23/277 C |
| 3,864,252 | 2/1975 | Morin et al. | 210/59 |
| 3,898,058 | 8/1975 | McGill | 55/50 |
| 3,930,803 | 1/1976 | Winter | 23/277 R |
| 3,960,504 | 6/1976 | Griffin | 23/277 C |
| 4,015,927 | 4/1977 | Culpepper, Jr. | 431/5 |
| 4,048,007 | 9/1977 | Valle-Riestra | 162/57 |
| 4,135,891 | 1/1979 | Borger et al. | 55/59 |
| 4,190,423 | 2/1980 | Winter | 55/20 |
| 4,236,973 | 12/1980 | Robbins | 203/41 |
| 4,273,621 | 6/1981 | Fornoff | 203/41 |
| 4,314,891 | 2/1982 | Knobel | 203/23 |
| 4,314,906 | 2/1982 | Dunn et al. | 210/754 |
| 4,377,396 | 3/1983 | Krauss et al. | 55/59 |
| 4,412,924 | 11/1983 | Feather | 210/744 |
| 4,508,545 | 2/1985 | DeLoach | 55/196 |
| 4,517,094 | 5/1985 | Beall | 210/664 |
| 4,544,488 | 10/1985 | O'Brien | 210/664 |
| 4,564,447 | 1/1986 | Tiedemann | 55/196 |
| 4,601,789 | 6/1986 | Bjorklund | 202/182 |
| 4,758,253 | 7/1988 | Davidson et al. | 55/77 |
| 4,764,272 | 8/1988 | Fox, Sr. | 210/104 |
| 4,844,795 | 7/1989 | Halwani | 210/98 |
| 5,032,230 | 7/1991 | Shepherd | 202/200 |
| 5,061,458 | 10/1991 | Miller | 55/196 |
| 5,104,525 | 4/1992 | Roderick | 55/196 |

FOREIGN PATENT DOCUMENTS 3931013 3/1991 Fed. Rep. of Germany ...... 202/200
2035814A 6/1980 United Kingdom .

Primary Examiner—Wilbur Bascomb, Jr.

[57] ABSTRACT

A system is disclosed for recovering and disposing of volatile organic contaminants, from water contaminated with organics, which system includes a pump to feed water from the body of contaminated water to the system, with indirect heat exchange and direct steam addition to raise the temperature of the water, a stripping vessel to strip the heated water with gas to strip the volatile contaminants from the water, gas supply to provide stripping gas to the vessel conduits to pass the removed volatile contaminants to a vessel containing a bed of adsorbent selective for the removal organics and regenerating the near-saturated bed by stripping with ambient air heated by heat exchange with the exhaust gas from a fuel-fired heater, passing the contaminant-containing regenerating gas from the regenerating bed to said fuel-fired heater, and combusting the contaminants in said fuel-fired heater.

6 Claims, 1 Drawing Sheet

SYSTEM FOR REMOVAL AND DISPOSAL OF MINOR AMOUNTS OF ORGANICS FROM CONTAMINATED WATER

BACKGROUND OF THE INVENTION

There are numerous instances where hydrocarbon fuels become mixed with water following leakage from tanks, spills of fuels of the ground the from condensation of moisture within a tank as may occur when the fuel tank is substantially empty. Modern gasolines are being formulated with increasing amounts of organic oxygenates, such as methyl tertiary butyl (mtbe), methyl tertiary amyl ether (tame), and the like. The oxygenates are more soluble in water than are the traditional hydrocarbon components of the fuels. When water becomes contaminated with minor amounts of these organics it is desirable to remove the organic content so as to negate environmental problems. The greater affinity of the oxygenates for water leads to generally higher concentrations of the oxygenates in water than has historically been found for hydrocarbons and renders separating them from the water to increasingly lower levels mandated by regulations a difficult problem.

A traditional way for treating wastewater contaminated with volatile organics is to contact the wastewater in a stripping column with a gas such as air, as disclosed, e.g., in British Patent 2,035,814A. When designing the equipment for a given set of conditions the amount of contaminant that can be removed decreases as the temperature decreases.

When groundwater becomes contaminated with minor amounts of these organics, vast amounts of energy may be required to reduce the organics to a level of less than a few parts per million, and even more energy to achieve levels in the parts per billion range.

It is an object of this invention to provide an energy efficiency system having the capability for continuous operation to treat significant quantities of, e.g., contaminated groundwater, and to reduce the contamination by oxygenates to environmentally acceptable levels.

It is a further object to dispose of the removed oxygenates in an energy efficient as well as environmentally acceptable matter.

SUMMARY OF THE INVENTION

The invention provides a system for reducing the level of minor amounts of volatile organic contaminants in water containing such contaminants, which includes:

A) water supply means for supplying water to said system and capable of being connected to a supply of water contaminated with minor amounts of volatile organic components;

B) heat exchange means having a first inlet connected to said water supply means, having an first internal volume for heating said contaminated water by indirect heat exchange with hot product water, said internal volume communicating with a first outlet, and also having a second inlet, said second inlet communicating with a second internal volume in heat exchange relation with said first internal volume, and a second outlet communicating with said second internal volume;

C) an upright stripping vessel containing packing or trays for contacting contaminated water with a stripping gas, said vessel having a water inlet and a gas outlet each disposed in the upper part of said vessel and having a water outlet and a gas inlet disposed in the lower part of said vessel;

D) a feed conduit for stripping vessel feed water connecting the outlet of said heat exchange means to the water inlet of said stripping vessel;

E) steam supply means adapted to be connected to a supply of steam and connected to said feed conduit for vessel feed water for steam contacting water in said conduit and heating said water to a desired temperature;

F) a stripped water conduit for stripping vessel product water connecting the outlet from said stripping vessel with the second outlet of said heat exchange means;

G) a system effluent conduit connected to the second outlet of said heat exchange means for passing water having reduced level of volatile organic contaminants from the system;

H) means for supplying air connected to said gas inlet of said stripping vessel for stripping volatile organic contaminants from water in said stripping vessel;

I) at least one adsorber vessel containing a bed of solid adsorbent capable of selectively adsorbing the volatile organics from the contaminated gas;

J) a conduit for stripper vessel product gas connecting the gas outlet of the stripping vessel to said at least one adsorber vessel, K) a vent to the atmosphere from said adsorber vessel;

L) a valved inlet into said adsorber vessel on the other side of the adsorber vessel from said vent, said inlet being connected to said conduit for stripper vessel product gas;

M) a valved conduit from said adsorber vessel, connecting the inlet side of said bed to the inlet of a furnace;

N) means for passing backwash air through said bed for desorbing volatile organics therefrom and discharging said desorbed organics in said furnace; and O) means for stopping said discharge of backwash air to said furnace when the organics are substantially desorbed from the bed.

The invention further provides a continuous process for containing volatile organic contaminants which process comprises:

A) supplying water containing-volatile organic contaminants to a heat exchanger and heating said contaminant-containing water by indirect heat exchange with water having the level of contaminants reduced according to the instant process;

B) further heating the contaminant-containing heated water from step A) by direct exchange with steam;

C) stripping the heated, contaminated water from step B) with air to obtain a hot product water having substantially reduced contaminants and a contaminated air stream;

D) passing the hot product water from step C) to said heat exchanger to cool the product water;

E) passing said contaminated air stream through a bed of solid adsorbent capable of selectively adsorbing organics from the organics-laden air;

F) stopping the flow of organics laden air through said bed before the adsorbent becomes saturated with organics;

G) heating a backwash gas by indirect heat exchange with a furnace;
H) subsequently backwashing said bed with said heated backwash gas for a period long enough to desorb enough organics to regenerate said bed; and
I) passing the organics-containing backwash gas to said furnace wherein the organics contained in said backwash gas are burned.

BRIEF DESCRIPTION OF THE DRAWINGS

The invention will be further explained with reference to the accompanying drawings wherein.

DESCRIPTION OF PREFERRED EMBODIMENTS

The present invention provides an inexpensive and flexible system enabling comparatively low energy costs for recovering and disposing of volatile organics from water which has been contaminated with such organics, and particularly oxygenates such as asymmetrical ethers.

The system has the capability to be effective for reducing the levels of contamination in the treated water product to or below levels generally considered to be acceptable for return to the environment.

Figure 1:
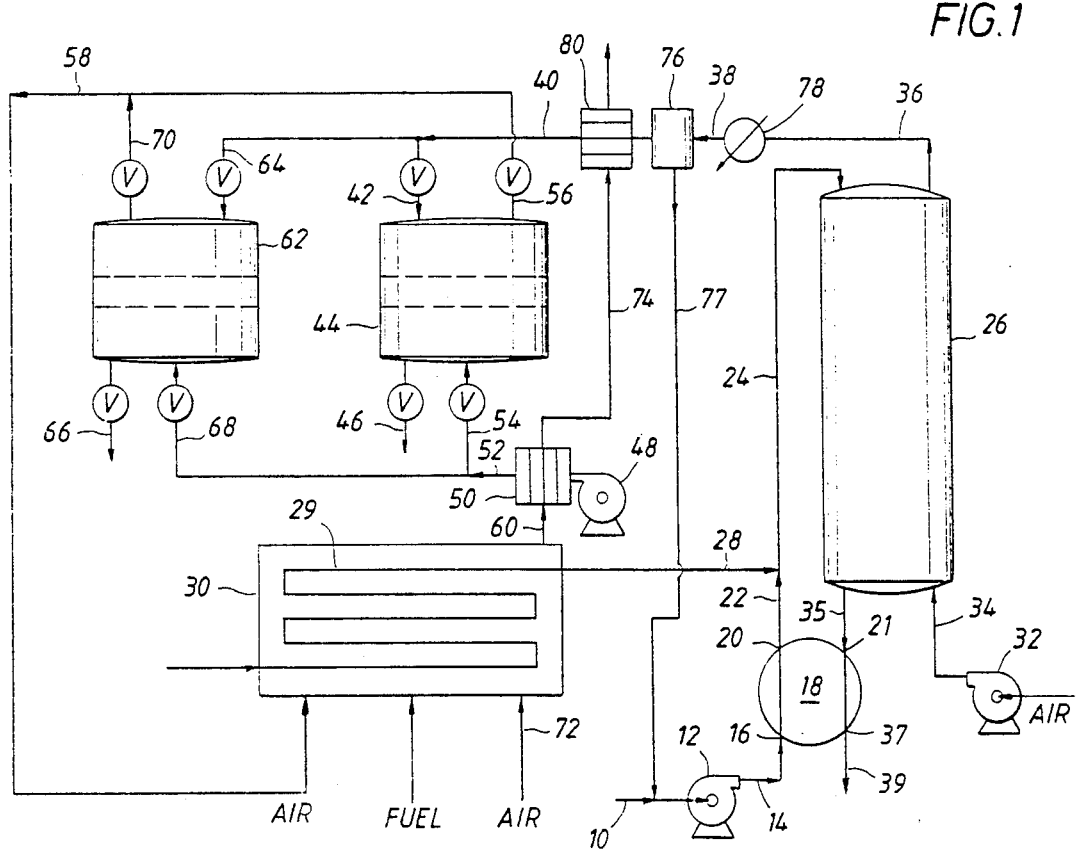
FIG. 1 is a schematic representation of a preferred embodiment of the system of this invention.

Referring now to the drawings, FIG. 1 is a schematic representation of a system embodying this invention, and is provided to show the various functions that will be employed without regard to scale. Contaminated water from a source not shown is fed to the system via line 10 to pump means 12. The contaminated water passes through conduit 14 to the first inlet 16 of the heat exchanger 18 having an internal volume where it is heated by indirect heat exchange with "clean", i.e., decontaminated water product from the system. Any known conventional, unfired, heat-transfer equipment design, such as a shell and tube heat exchanger or plate and frame heat exchanger, may be used, so long as there is no leakage or other commingling of contaminated water into the clean water. The heated water passes from heat exchanger 18 via first outlet 20 through lines 22 and 24 to the upper part, and preferably the topmost part of stripping vessel 26. Steam supply conduit 28, adapted to be connected to a supply of steam such as, e.g., a heat exchanger in furnace 30, is connected to line 22 to further heat the partially heated water flowing in lines 22 and 24. The amount of steam supplied via conduit 28 is controlled to achieve any desired elevated temperature of the contaminated water entering stripping vessel 26. Supplying this additional heat by direct contact with steam has advantage over, e.g., heating the water in a fired heat exchanger. Steam contact is more efficient in the transfer of heat. Further is suitably applied when the groundwater to be treated contains significant levels of readily precipitated ions such as, e.g., iron or calcium. Steam contact avoids potential fouling problems caused by precipitation of these ions in the heat exchanger which could require frequent, costly maintenance disruptive of continuous operation.

Stripping vessel 26 may be a trayed column, but preferably is a packed column containing any conventional packing, such as, e.g., Raschig rings, Lessing rings, Berl saddles, Intalox saddles, Tellerettes, Pall rings and the like, and preferably contains a high surface area packing such as marketed under the trade-name Jaeger Tripacks. Generally, best results for removal of the said ethers are obtained by the use of tall, small diameter columns. The stripping vessel will preferably have a trayed or packing height of about twenty feet, and more preferably thirty feet, and a diameter of about one to four feet, depending on the water flow rate. Contaminated heated water flow downwardly through the packing in stripping vessel 26 and countercurrently contacts stripping gas supplied to the bottom by gas supply means 32 via line 34. Stripping as supply means suitably is a conventional air blower which can supply clean ambient air as the stripping gas, preferably over a range of flow rates. The water after having the volatile organics stripped out by the stripping gas is passed from the bottom of stripping column 26 via line 35 to the second inlet 21 of heat exchanger 18 where it is closed, by transfer of heat by indirect exchanger to additional contaminated water passing through said heat exchanger 18. The "clean" cooled water is passed from heat exchanger 18 via outlet 37 and line 39 and from the system for reuse or release to a receiving body of water such as groundwater, a lake, stream, or the like.

In stripping vessel 26 the upflowing air contacts the downflowing contaminated water and strips the organics from the water. The organics-containing air is passed from the top of stripping vessel 26 via conduits 36, 38, 40 and valved conduit 42, to a bed of adsorbent in adsorber vessel 44 wherein substantially all of the volatile organics are removed from it, and air substantially free from volatile organics is passed to the atmosphere via valved conduit 46. Before the adsorbent is saturated and before a significant amount of organics carried by the air breaks through the bed, the adsorbent must be regenerated. Most adsorbents use only a small percentage of their total capacity when employed in the present invention. For example, if an adsorbent is used until it is completely saturated, too much of the organic materials carried out by the air stream will break through the bed and enter the atmosphere. On the other hand, completely regenerating the adsorbent so that all of the organics are gone from it is a very difficult and costly process which will not normally be done. The adsorbent beds employed in this invention will normally operate over that portion of their capacity between the point where the organics break through the bed and the point of desorption that can be achieved by backwashing the bed with heated air.

In accordance with the invention, regeneration is effected by backwashing the adsorbent bed with a readily available gas such as air to remove volatilizable organics from the bed by vaporizing them into the backwash has. The vapor-containing backwash gas is then passed to a suitable furnace where it is incinerated whereby the organic vapors contained therein are converted essentially to innocuous carbon dioxide and water. The backwashing is continued for a time sufficient to produce a regenerated adsorbent, that is, an adsorbent that is capable of adsorbing additional organic vapors when the organics laden air is passed through again in the adsorption mode. It is within the scope of this invention to provide heat to the adsorbent bed to aid in the regenerating process. The heat may be in the form of electric heating elements, steam or hot water coils, but preferably is in the form of hot air obtained as shown in FIG. 1 by passing the backwash air from blower 48 through heat exchanger 50 which is heated by stack gas in conduit 60 from furnace 30 and is then passed through conduit 52 and valved conduit 54 through the adsorbent bed in adsorber vessel 44. The organics stripped from the adsorbent bed are carried via valved conduit 56 and conduit 58 to the inlet of furnace 30 where they are burned and passed as innocuous products with the stack gas exiting furnace 30 via conduit 60.

The system of this invention preferably is continuous, i.e., operative at all times. It is also possible to operate on an intermittent basis using as single adsorbent bed by discontinuing the flow of feed water and stripping air and steam injection to the system during periods of adsorbent bed regeneration. Regeneration may also be effected while water remains flowing, by reducing contaminated water flow, while maintaining the temperature the same by reducing steam flow and reducing the amount of stripping air supplied to the stripping column 26 so as to maintain the desired ratio of air to water in the column, and simultaneously passing the stripping air from the column directly to the furnace. In a preferred mode, two adsorbent beds are employed, and one adsorbs the organic vapors while the other is being regenerated.

Since the operation of a two bed system is generally understood by those skilled in the art, it will be described only briefly. For sake of illustration it will be assumed that the adsorbent bed in vessel 62 is in the adsorbent mode and that the adsorbent bed in vessel 42 is regenerated. When sufficient volatile organics have been adsorbed in the bed in vessel 62 so that regeneration of the bed is appropriate the valve on conduit 64 will be closed and the valve on conduit 42 will be opened. At that point the valve on conduit 46 will be opened and the valve on conduit 66 will be closed; the valve on conduit 54 will be closed, the valves on conduits 68 and 70 will be opened and blower 48 will be placed in operation so that a flow of air passes through heat exchanger 50, conduit 52 and valve conduit 68 to backwash the adsorbent bed in vessel 62 with air through valved conduit 70 and ultimately into conduit 58 which discharges into fired furnace 30. Sufficient air is added through line 72 so that the volatile organics are burned essentially to innocuous material such as carbon dioxide and water vapor which are vented through lines 60 and 74.

In a preferred embodiment an optional phase separator 76, also known as a knockout pot, is installed to remove any condensed water in line 36 before the stripped gas enters the adsorbent beds in vessels 44 and 62. The separated water is passed from phase separator 76 via line 77 and is recycled with feed water entering the system via line 10. In this manner any volatile organics contained therein are disposed of without adverse impact on the environment. In a properly designed system this recycle would amount to less than about one percent of the fresh contaminated water feed to the system and would not significantly impact either the cost of the system or the amount of energy required to operate the process.

In a still more preferred embodiment the relative humidity of the organics-rich stripper air in line 36 is adjusted to less than about 85% and preferably less than about 60% in order to enhance the selectivity of the sorbent bed for the volatile organics. This is accomplished by first cooling the air in line 36 by means of optional condenser 78 to lower the temperature to about 60° F. and separating the liquid, e.g., by means of optional phase separator 76, and then heating the air from which the water has been condensed by indirect heat exchanger in optional heat exchanger 80 with exhaust from the furnace in line 74. Preferably the volatile organics-containing air in line 40 going to the bed of adsorbent is in the temperature range from about 70° F. to about 120° F. Heating the air without first passing it through the condenser also reduces the relative humidity but temperatures above about 120° F. should be avoided as excessive temperatures will adversely impact the ability of man sorbents to selectively adsorb the volatile organics, negating the positive effect of reducing relative humidity.

The invention will now be illustrated with reference to the following illustrative embodiment.

ILLUSTRATIVE EMBODIMENT

With reference to FIG. 1 contaminated water containing about 20,000 parts per billion (ppb) of mtbe from a groundwater source (not shown) and having a temperature of about 55° F. is connected to the system according to the invention via conduit 10 and is pumped via pump 12 at a rate of 70 gallons per minute (gpm) via conduit 14 to unfired heat exchanger 18. The contaminated water is heated by indirect heat exchange to a temperature of about 84° F. and is passed via line 22 and is heated by direct contact with steam supplied via line 28 to a temperature of about 96° F. and is passed via line 24 to the top of stripping vessel 26. Preferably the steam introduced into the system will be generated using heat exchanger 29 disposed in furnace 30 having a furnace fuel requirement of, e.g., about 525,000 Btu/hr, a fuel requirement of about 9 standard cubic feet per minute (scfm) of natural gas and combustion air to about 100 scfm. Water for steam generation is supplied from a suitable source, not shown, at a flow rate of about 0.75 gpm. However, any convenient source of steam may be used.

Stripping vessel 26 is a conventional packed column filled with Tripack packing. The stripping vessel will preferably have a height to diameter ratio above about 7, e.g., a packing height of about 30 ft and a diameter of about 2 ft (ratio of 15). The water passes downwardly in stripping vessel 26 in countercurrent flow to air flow of 1000 scfm fed to the bottom of stripping vessel 26 via line 32 from air blower 34. The ambient air has a temperature of about 32° F., and the effect of contact and stripping is that the water has been cleaned, i.e., has substantially reduced levels of mtbe on the order of about 50 ppb or less and the temperature is lowered on the order of about 5° F. to about 91° F. The clean water is passed from stripping vessel 26 to conduit 35 to inlet 21 of the heat exchanger 18 where the temperature is lowered to about 62° F. and is passed via exchanger outlet 37 and line 39 for use, or return to groundwater or a body of surface water.

The air now contaminated with the volatile organics stripped from the water exits stripper vessel 26 and is carried by conduits 36, 38, 40 and 42 to the inlet of adsorber vessel 44 containing a bed of adsorbent, e.g., activated carbon. In passing through the bed of adsorbent, the volatile organic vapors are removed from the air, and the organics-free air passes through the valved conduit 46 to the atmosphere.

When vessel 44 is in the adsorption mode the valves on conduits 54 and 56 will be closed to prevent the flow of organics-laden air therethrough. However, when the adsorbent bed in vessel 44 becomes sufficiently saturated with volatile organics to be regenerated the valves on conduits 64 and 66 will be opened and the valves on conduits 68 and 70 will be closed so that the organics-laden air from stripper vessel 26 passes through conduit 64 through the bed of adsorbent in adsorber vessel 62 wherein the organics are retained and the organics-fee air passes through valved conduit 66 to the atmosphere. After opening of valves on conduits 64 and 66, the valves on conduits 42 and 46 will be closed, and the valves on conduits 54 and 56 will be opened. At that point and blower 48 will be placed in operation so that a flow of air, suitably in the range from about 50 to about 200 scfm passes through indirect heat exchanger 50 and conduits 52 and 54 to backwash the adsorbent bed in vessel 44 with air through valved line 56, and ultimately line 58 which discharges into furnace 30. In furnace 30 the organics contained in the air added through line 58 are burned to essentially innocuous material such as carbon dioxide and water vapor which is vented through line 60, indirect heat exchanger 50 and line 75.

Generally the use of the heated backwash air, which has a temperature in the range of about 150° F. to 300° F. the time for regeneration will be a reasonably portion of the time that the system is in the adsorption mode. It is an advantage of the system that this comparatively low temperature regeneration of the adsorbent bed can take place over nearly all of the time required for the adsorption cycle of the alternate bed, at lower energy requirements resulting from integration of the system components.

When the adsorbent in vessel 44 is regenerated sufficiently, valved conduit 46 is opened, the valves on conduits 54 and 56 are closed and air blower 48 is taken out of operation by control means not shown. Thus the adsorbent bed in vessel 44 is restored and ready to be returned to the adsorption mode when the bed in vessel 62 becomes sufficiently saturated to require regeneration. It is evident that many conventional control circuits, e.g., timing circuits, may be used to control the operation of the valves and regeneration blower to assure smooth continuous operation.

The solid adsorbents suitably employed in this invention may be any of those known in the art which are capable of adsorbing organic vapors from a mixture of organic vapors and air. Exemplary adsorbents are activated carbon, and certain forms of porous minerals such as natural and synthetic zeolites, etc.

Figure 2:
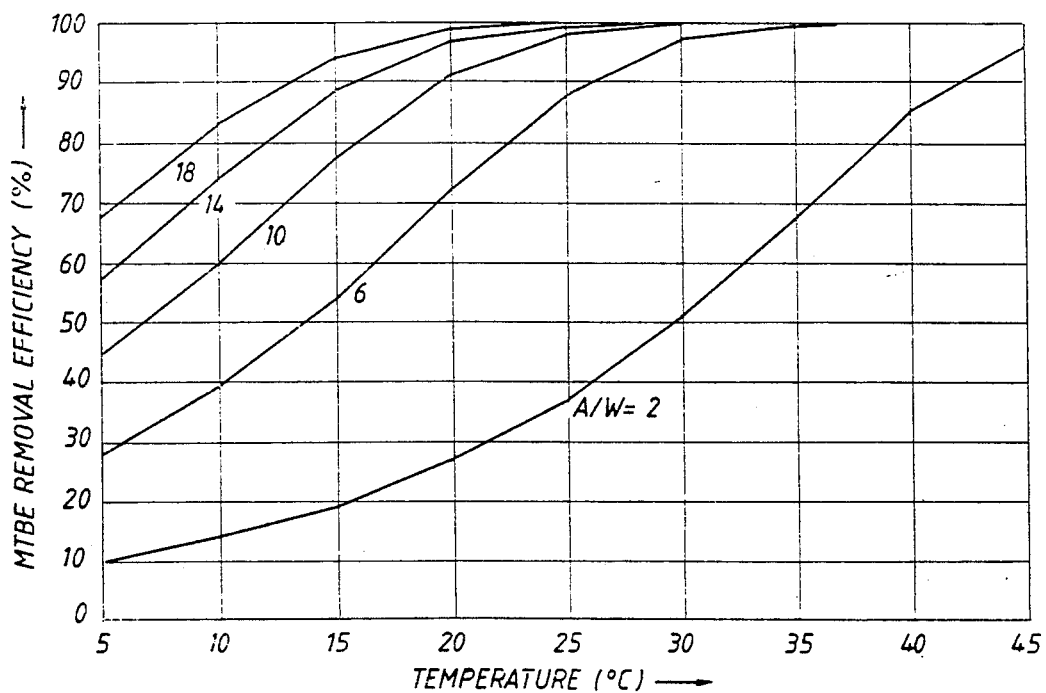
FIG. 2 is a graph comparing the calculated removal of methyl tertiary butyl ether from water containing the said ether at various rates of stripping air to water flow and the influence of temperature on the removal rate as well.

It is an advantage of the system of the invention that it provides flexibility to minimize the thermal and electric energy required to remediate water contaminated with volatile organics to clean, i.e., environmentally acceptable condition. FIG. 2 graphically compares the effect of different air to water ratios, i.e., scfm to gpm for air stripping mtbe from water heated to different temperatures in a stripping column having a diameter of 2 ft and having a packed height of 30 ft with 2-inch Tripack packing. With the instant system it is possible to optimize the thermal and electrical input to achieve the desired results for any particular contaminated feed, recognizing that part of the thermal energy input is obtained from the removed contaminants.

Normally, when treating large amounts of contaminated water, it will be preferably to use minimal heating of the water and the high rate of air stripping. The use of the adsorbent beds permits the use of such high flow rates while minimizing the amount of contaminant-carrying gas required to be supplied to the furnace. Typically, destruction of such organics requires a temperature of about 1400° F. to 1600° F. for a period of about one-half second or more. By use of the adsorbent beds, fuel to the furnace is not required to heat the large excess of stripping air used in the system. In addition, the backwash gas supplied to the furnace is preheated to a temperature well above that of the stripping gas and without additional energy input.

What is claimed is:

1. System for recovering and disposing of volatile organic contaminants from water containing such contaminants, which system includes:
A) water supply means for supplying water to said system and capable of being connected to a supply of water contaminated with minor amounts of volatile organic components;
B) a furnace and a heat exchange means, said heat exchange means disposed within said frame, said heat exchange means having a first inlet connected to said water supply means, having a first internal volume for heating said contaminated water by indirect heat exchange with hot product water, said internal volume communicating with a first outlet, and also having a second inlet, said second inlet communicating with a second internal volume in heat exchange relation with said first internal volume, and a second outlet communicating with said second internal volume;
C) an upright stripping vessel containing packing or trays for contacting contaminated water with a stripping gas, said vessel having a water inlet and a gas outlet each disposed in the upper part of said vessel and having a water outlet and a gas inlet disposed in the lower part of said vessel;
D) a conduit for stripping vessel feed water connecting the first outlet of said heat exchange means to the water inlet of said vessel;
E) steam supply means disposed to supply steam from said furnace and connected to said conduit for vessel feed water for heating wagers in said conduit to a desired temperature;
F) a conduit for vessel product water connecting the water outlet from said vessel with the second inlet of said heat exchange means;
G) a conduit connected to the second outlet of said heat exchange means for passing water having reduced level of volatile organic contaminants from the system;
H) means for supplying gas connected to said gas inlet of said stripping vessel for stripping volatile organic contaminants from water in said stripping vessel;
I) at least one adsorber vessel containing a bed of solid adsorbent capable of selectively adsorbing the volatile organics from the contaminated gas;
J) a conduit for stripper vessel product gas connecting the gas outlet of the stripping vessel to said at least one adsorber vessel;
K) a vent to the atmosphere form said adsorber vessel;
L) a valved inlet into said adsorber vessel on the other side of the adsorber vessel from said vent, said inlet being connected to said conduit for stripper vessel product gas;

M) a valved conduit from said adsorber vessel, connecting the inlet side of said bed to the inlet of said furnace;

N) means for passing backwash air through said bed for desorbing volatile organics therefrom and discharging said desorbed organics in said furnace; and O) means for stopping said discharge of backwash air to said furnace when the organics are substantially desorbed from the bed.

2. A system as in claim 1 wherein element (I) consists of two adsorber vessels where valves allow one adsorber vessel to operate in the adsorbent mode while the other vessel is regenerated.

3. A system as in claim 1 having in addition a phase separator connected on element (J) prior to said adsorber vessel for separating any liquid water from the gas in said conduit.

4. A system as in claim 1 having in addition a heat exchanger disposed on element (J) prior to said phase separator for condensing part of the water vapor in the gas in said conduit.

5. A system as in claim 1 having in addition a heat exchanger disposed on element (J) after said separator for heating the gas from which condensed water has been separated.

6. A system as in claim 1 wherein element (C) contains packing.

* * * * *